United States Patent
Takano et al.

(10) Patent No.: US 9,766,412 B2
(45) Date of Patent: Sep. 19, 2017

(54) REDUCED-PROFILE DATA TRANSMISSION ELEMENT CONNECTORS, ADAPTERS, AND CONNECTION ASSEMBLIES THEREOF

(71) Applicant: Senko Advanced Components, Inc., Marlborough, MA (US)

(72) Inventors: Kazuyoshi Takano, Southborough, MA (US); Kenji Iizumi, Kowloon (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/070,770

(22) Filed: Mar. 15, 2016

(65) Prior Publication Data

US 2016/0195682 A1    Jul. 7, 2016

Related U.S. Application Data

(62) Division of application No. 14/299,224, filed on Jun. 9, 2014, now Pat. No. 9,618,702.

(51) Int. Cl.
   *G02B 6/38*    (2006.01)

(52) U.S. Cl.
   CPC ........... *G02B 6/3825* (2013.01); *G02B 6/387* (2013.01); *G02B 6/3885* (2013.01); *G02B 6/3893* (2013.01); *G02B 6/3869* (2013.01)

(58) Field of Classification Search
   CPC ... G02B 6/3825; G02B 6/3831; G02B 6/3895
   See application file for complete search history.

(56) References Cited

U.S. PATENT DOCUMENTS

| | | | | | |
|---|---|---|---|---|---|
| 4,872,736 | A | * | 10/1989 | Myers | G02B 6/3878 385/60 |
| 5,129,024 | A | * | 7/1992 | Honma | G02B 6/3825 385/53 |
| 5,214,731 | A | * | 5/1993 | Chang | G02B 6/3849 385/65 |
| 6,290,527 | B1 | * | 9/2001 | Takaya | G02B 6/389 385/76 |

(Continued)

*Primary Examiner* — Rhonda Peace
(74) *Attorney, Agent, or Firm* — Pepper Hamilton LLP

(57) ABSTRACT

Reduced-profile connection components are described. The reduced-profile connection components are configured to connect various data transmission elements, including cables, network devices, and computing devices. A non-limiting example of a connection component includes a fiber optic connection component, including connectors, adapters, and assemblies formed therefrom. In some embodiments, the connection components may include mechanical transfer (MT) and multi-fiber push-on/pull-off (MPO) connection components, such as MT ferrules and MPO adapters. The reduced-profile connection components configured according to some embodiments have a smaller profile and/or require less parts to achieve a connection compared to conventional connection components. In some embodiments, the reduced-profile connection components may be used with conventional connection components. For example a reduced-profile connector may use a conventional MT ferrule to establish a connection within a conventional MPO adapter.

14 Claims, 18 Drawing Sheets

(56) References Cited

U.S. PATENT DOCUMENTS

| | | | | |
|---|---|---|---|---|
| 8,915,653 B2* | 12/2014 | Haley | .................. | G02B 6/3893 |
| | | | | 385/70 |
| 2007/0098329 A1* | 5/2007 | Shimoji | ............... | G02B 6/3893 |
| | | | | 385/76 |
| 2014/0270646 A1* | 9/2014 | Haley | .................. | G02B 6/3893 |
| | | | | 385/70 |
| 2015/0355417 A1* | 12/2015 | Takano | ................ | G02B 6/3825 |
| | | | | 385/60 |

* cited by examiner

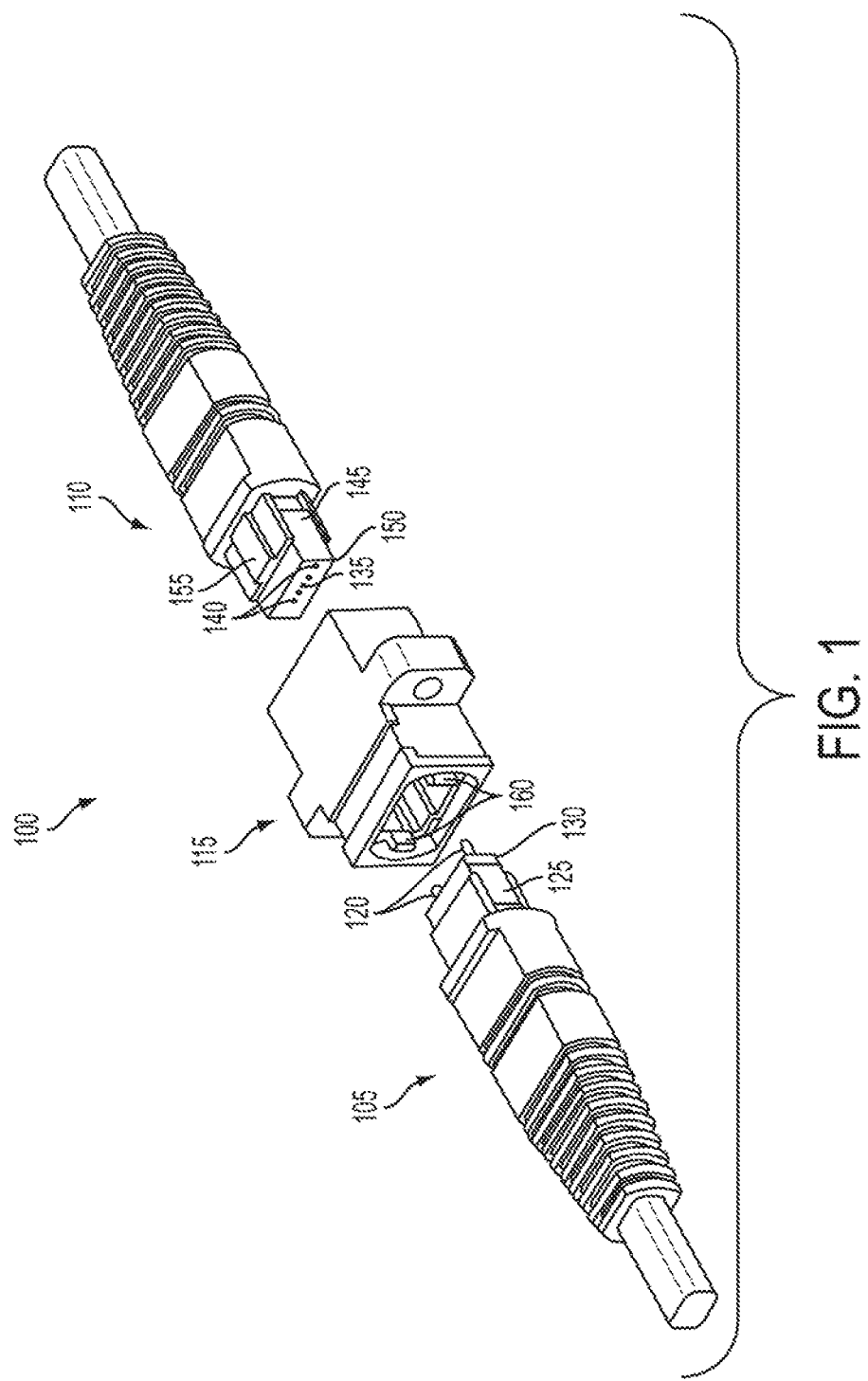

REDUCED-PROFILE DATA TRANSMISSION ELEMENT CONNECTORS, ADAPTERS, AND CONNECTION ASSEMBLIES THEREOF

CROSS-REFERENCE TO RELATED APPLICATIONS

This application is a divisional application of and claims priority to U.S. patent application Ser. No. 14/299,224, filed Jun. 9, 2014.

FIELD OF THE INVENTION

The described technology generally relates to components for connecting data transmission elements and, more specifically, to connectors, adapters, and connection assemblies formed therefrom that are configured to have a reduced profile and/or a reduced quantity of parts in comparison to conventional connection components while providing a secure connection between data transmission elements, such as cable segments, equipment, and/or devices.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs for data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. However, terminating these fibers with connectors greatly increases the space required to connect cable segments and communication devices. Although multiple fibers may be arranged within a single connector, the resulting connection component may still increase the space used by the optical fibers by 20 to 50 fold. For example, multi-fiber connectors such as those using multi-fiber push-on/pull-off (MPO) technology may connect 12 or 24 fibers. However, a typical MPO connector may have a length of about 30 millimeters to 50 millimeters and a width of about 10 millimeters to 15 millimeters. Multiplying these dimensions by the hundreds of connections in a typical data center results in a significant amount of space devoted to these cable connections. In order to cost-effectively increase data transmission capacity and speed, data centers must increase the number of fiber optic cables and, therefore, cable connections within existing space. Accordingly, data centers and other communication service providers would benefit from a multi-fiber connector having a reduced profile capable of securely connecting multiple fibers while requiring less space than conventional multi-fiber connectors.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In one aspect, a reduced-profile connection assembly may include an adapter, a ferrule having a connection side, and a reduced-profile clip fixedly arranged within the adapter, the reduced-profile clip having hooks configured to engage a portion of the ferrule opposite the connection side to prevent movement of the ferrule within the adapter.

In one aspect, a reduced-profile connection assembly may include a ferrule having a connection end, a connector including an inner housing having the ferrule fixedly arranged therein at a first end and flanges extending from a second end opposite the first end and an ejector housing disposed around the inner housing and configured to slide along the inner housing between a locked position and an unlocked position, and an adapter having a clip fixedly arranged therein, the clip having hooks configured to engage protrusions extending from an outer surface of the inner housing to prevent movement of the inner housing within the adapter, wherein the ejector housing interfaces with the clip in the locked position to prevent disengagement of the hooks from the protrusions.

In one aspect, a reduced-profile connection assembly may include a ferrule, a connector having the ferrule fixedly arranged therein and comprising at least one adapter latch having at least one adapter latch projection, and an adapter having at least on recess, the at least one recess configured to engage the adapter latch projection when the connector is locked in the adapter to prevent movement of the connector within the adapter.

In one aspect, a reduced-profile connection assembly may include a ferrule, a connector having the ferrule fixedly arranged therein and comprising at least one adapter latch having at least one adapter latch projection, and an adapter having a clip fixedly arranged therein, the clip having a recess configured to engage the adapter latch projection when the connector is locked in the adapter to prevent movement of the connector within the adapter.

BRIEF DESCRIPTION OF THE DRAWINGS

The above and other objects of the present invention will become more readily apparent from the following detailed description taken in connection with the accompanying drawings.

FIG. 1 depicts an illustrative conventional multiple-fiber push-on/pull-off (MPO) type multi-fiber connection assembly.

DETAILED DESCRIPTION

Figure 2A:
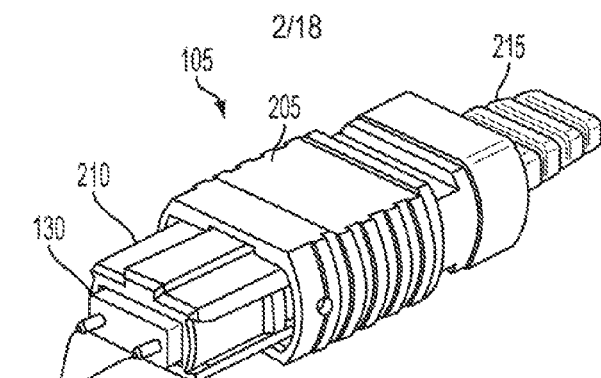
FIGS. 2A-2C depict an illustrative connector of a conventional MPO connection assembly.

The described technology generally relates to components configured to connect data transmission elements, such as cable segments, communication equipment, networking devices, and computing devices. In some embodiments, the data transmission elements may be connected using reduced-profile connection components, including, without limitation, connectors, ferrules, adapters, and connection assemblies formed therefrom. The reduced-profile connection components may be configured to require fewer elements and/or less space than conventional connection components. In general, a reduced profile connection component may be smaller in at least one dimension in comparison to a corresponding conventional connection component. In some embodiments, the reduced-profile connection components and/or portions thereof may be used with existing conventional connection components. For example, some embodiments may include a reduced-profile connector configured to provide a secure connection using a conventional adapter. The reduced-profile connection assemblies and portions thereof may be made from various resilient materials, such as plastics, polymers, rubber, silicon-based materials, and any combination thereof.

The described technology provides multiple technological advantages. A non-limiting example of a technological advantage is that reduced-profile connection components and connections formed using the reduced-profile connection components require less space, for example, on a connection interface of a device in a data room. In this manner, an increased number of connections may be formed in a smaller area. Another non-limiting example of a technological advantage is that reduced-profile connection components may generally require fewer elements and/or materials than corresponding conventional connection components. This technological advantage may operate, among other things, to reduce the effort and/or cost associated with assembling the connection component. A further non-limiting example of a technological advantage is that the reduced-profile connection components are easier to manipulate, such as establishing and/or removing a connection (for instance, "plugging in"/"unplugging" a component) than corresponding conventional connection components.

In some embodiments, the data transmission elements may include fiber optic data transmission elements. In some embodiments, the reduced-profile connection components may include components configured to provide a secure connection for fiber optic data transmission elements. In some embodiments, the reduced-profile connection components may be configured to implement various types of fiber optic connection components, including multiple-fiber (or multi-fiber) connection components. Non-limiting examples of multi-fiber connection components include mechanical transfer (MT), multiple-fiber push-on/pull-off (MPO), and multi-fiber MTP® connectors ("MTP"). Although fiber optic connection components, and MPO-compatible components in particular, are used as examples herein, embodiments are not so limited as any type of data transmission medium and associated components capable of operating according to some embodiments are contemplated herein.

FIG. 1 depicts an illustrative conventional MPO type multi-fiber connection assembly (an "MPO connection assembly"). As shown in FIG. 1, an MPO connection assembly 100 may include connectors 105, 110 and a corresponding optical fiber adapter ("adapter") 115. The connectors 105, 110 may be designated as a male connector 105, which has guide pins or "pins" 120, and a female connector 110, which has pin receptacles, guide pin holes, or "holes" 140. The guide pins 120 may be arranged within a male ferrule 130 on a connection side thereof and the guide pin holes 140 may be arranged within a female ferrule 150 on a connection side thereof. The ferrules 130, 150 may be formed from plastic or other polymer materials. The ferrules 130, 150 may be configured as MT type ferrules.

The connectors 105, 110 may be coupled with each other through the adapter 115 such that the guide pins 120 can be inserted into the guide pin holes 140 and the face of the male ferrule 130 will be in contact with the face of the female ferrule 150, connecting the ends of the optical fibers (or "ribbon") 135 arranged within each respective ferrule. The optical fibers 135 may be arranged between the guide pins 120 on the male ferrule 130 and between the guide pin holes 140 on the female ferrule 150 such that the ends of the optical fibers will line up and form a continuous our substantially continuous fiber optic connection. The ferrules 130, 150 may include various numbers of optical fibers 135, such as 1, 2, 4, 8, 12, 24, or 72 optical fibers. When the connectors 105, 110 are coupled through the adapter 115, hooks (for example, flanges or resilient flanges) 160 disposed on a clip (an "adapter clip") arranged within the adapter 115 can hook on recesses 125 of the connector 105 and recesses 145 of the connector 110 to support and maintain the connection of optical fibers 135 between the ferrules 130, 150. The guide pins 120 and the guide pin holes 140 operate to line up the ends of the optical fibers 135 on the faces of the ferrules 130, 150 and the adapter 115 operates to provide a compression force on the ferrules configured to maintain sufficient contact therebetween to support a connection between the opposing optical fibers.

Figure 2B:
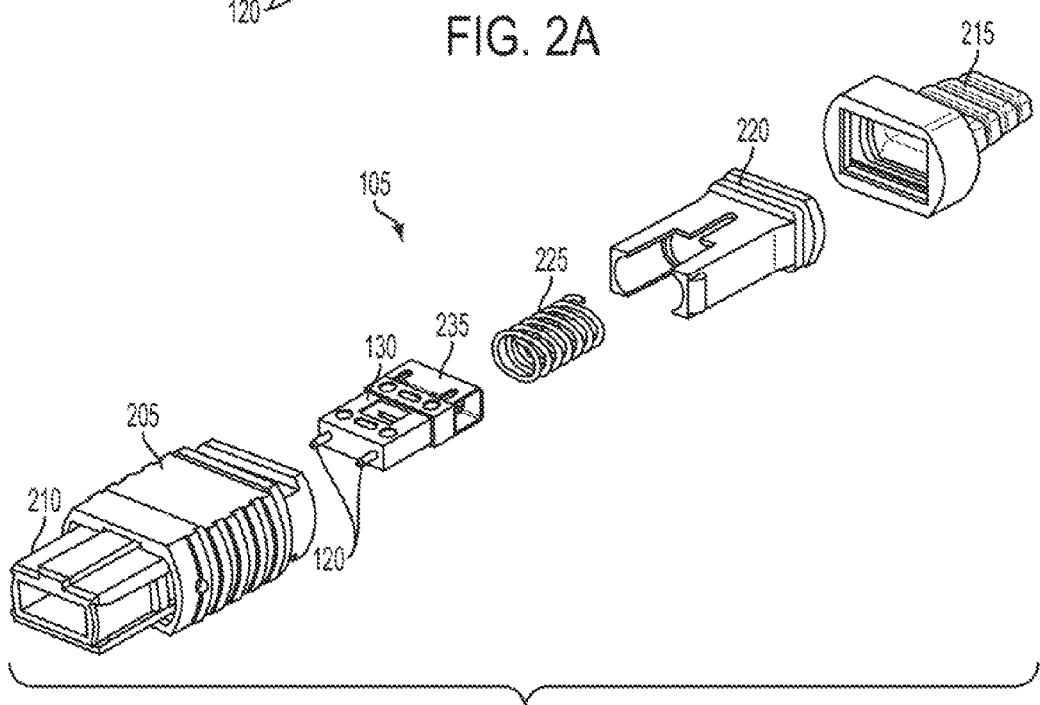
Figure 2C:
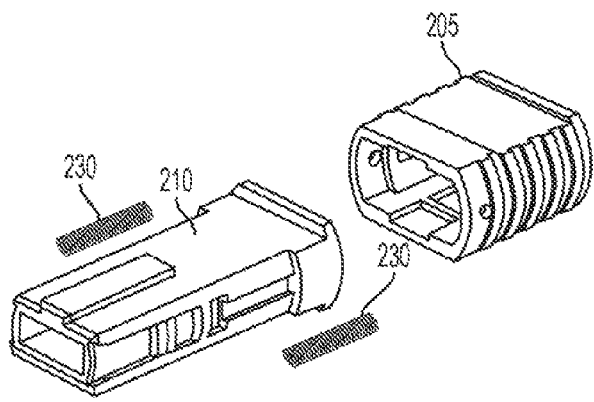

FIGS. 2A-2C depict an illustrative connector of a conventional MPO connection assembly. As shown in FIG. 2A, a connector 105 may include an ejector housing 205 slidably disposed about a front housing 210 connected to a boot 215. A ferrule 130 having a pin holder 235 (collectively, may be referred to as a "ferrule" herein) may be arranged within the front housing 210. Although a male connector 105 including a male ferrule 130 is depicted in FIGS. 2A-2C, the illustrative connector depicted therein may be configured the same or substantially similar using a female connector 110 including a female ferrule 150. FIG. 2B depicts an expanded (or "exploded") view of the connector 105. As shown in FIG. 2B, the connector may include a spring 225 configured to provide a force against the ferrule 130 in a direction toward the front housing 210 and away from the boot 215. The spring 225 may be arranged within a spring push (or "back post") 220 configured to interface with the boot 215. FIG. 2C depicts an expanded view of the ejector housing 205 and the front housing 210 showing the springs 230 arranged therebetween. The springs 230 may operate to provide a force against the ejector housing 205 to push the ejector housing toward the front of the front housing 210 where the ferrule projects from the front housing and away from the boot 215.

The connector 105 may be inserted (or plugged) into an adapter 115 by pushing the connector, for example, using the boot, into the adapter until the hooks 160 in the adapter hook (or "snap") on the recesses 125 of the connector. The springs 230 may operate to maintain the ejector housing 205 in the forward (or "locked") position to retain the hooks 160 in the recesses 125 to preserve a secure connection. The connector may be removed (or unplugged) from the adapter by pulling on the ejector housing 205 in a direction away from the adapter. As the ejector housing 205 is pulled in a direction away from the adapter 115, the ejector housing can slide over the front housing 210 in a direction away from the adapter to remove the hooks 160 from the recesses 125, thereby disconnecting the connector 105.

As shown in FIGS. 2A-2C, conventional MPO connectors 105 require multiple parts. For example, not including the ferrule 130 or components thereof, the connector 105 may require about 7 parts, including the ejector housing 205, the front housing 210, the boot 215, the spring push 220, the spring 225, and the springs 230. All of the components of the connector 105 require time, material, and other resources and/or costs to manufacture and assemble. In addition, the multiple components required for the connector 105 require the connector and connection assembly 100 to have certain minimum dimensions and, therefore, an overall profile. For example, a conventional connector 105 may be about 30 millimeters to about 50 millimeters long and about 12 millimeters to about 20 millimeters wide. Furthermore, plugging in the connector 105 to the adapter 115 requires a sufficient pushing force, generally from the boot 215, while unplugging the connector requires a relatively large pulling force on the ejector housing 205. Accordingly, manipulating the components of the connection assembly 105, such as plugging in/unplugging the connector 105, is inefficient and challenging within the limited space around racks and modules within a typical data room. Moreover, assembling the connector 105 components, such as the housings 205, 210 and the springs 230 and the spring push 220 and the spring 225, is time consuming, inefficient, and consumes valuable resources that may otherwise be dedicated to data room maintenance.

Figure 3:
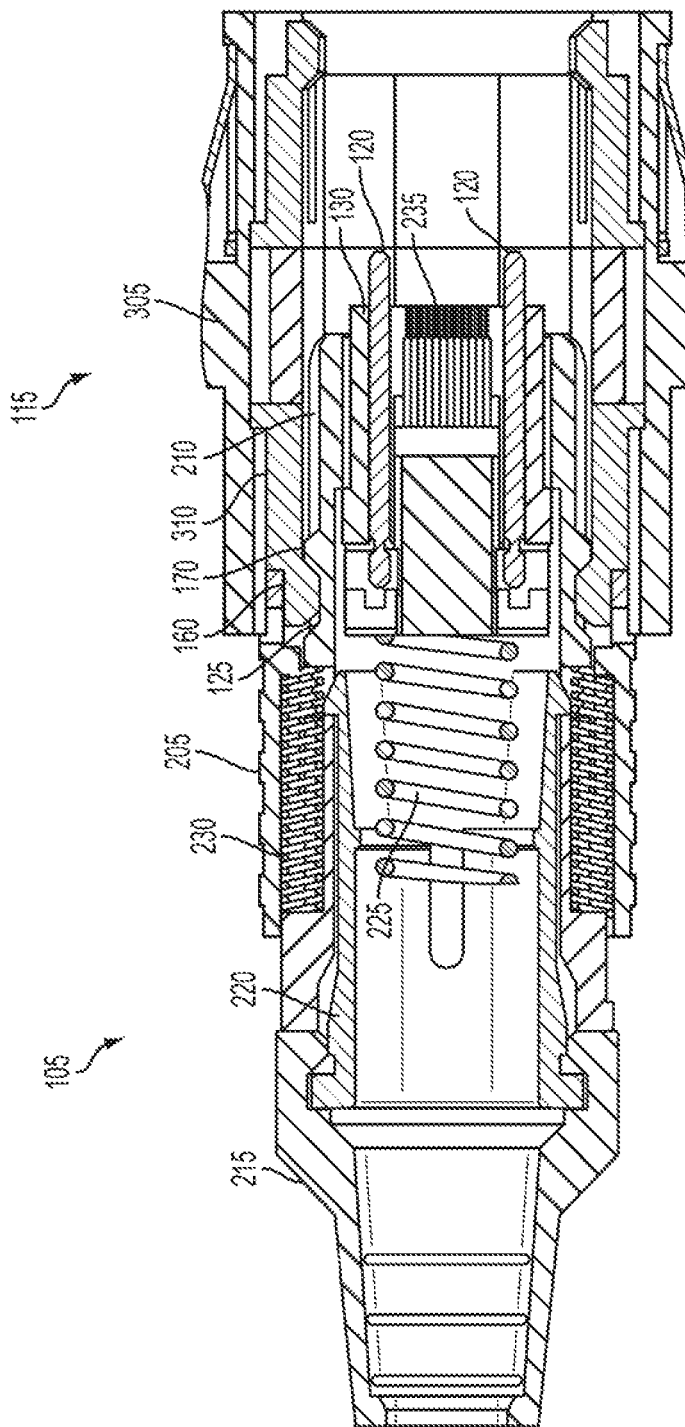
FIG. 3 depicts a cross-sectional view of a connector arranged within an assembly.

FIG. 3 depicts a cross-sectional view of a connector arranged within an assembly. As shown in FIG. 3, as the connector 105 is pushed into the adapter 115, the hooks 160 arranged on the clip 310 may spread apart and be pushed over projections 170 on the outer surface of the front housing 210 to become seated in the recess 125. In the locked position, the springs 230 push the ejector housing 205 over and/or against the hooks 160 to prevent the hooks from spreading apart and moving over the projections 170, thereby maintaining the hooks within the recesses 125 and preventing removal of the connector 105 from the adapter. In order to remove the connector 105 from the adapter 115, the ejector housing 205 must be pulled in a direction away from the adapter and toward the boot 215. The ejector housing 205 must be pulled with sufficient force to overcome the tension provided by the springs 230 in order to allow the ejector housing to slide over the front housing 210 and out of the adapter 115, uncovering the hooks 160. A continued force on the ejector housing 205 away from the adapter 115 causes the connector 105 to move in a direction away from the adapter, spreading apart the hooks 160, which slide over the projections 170 and free the connector 105 from the adapter.

FIGS. 4A-4E depict illustrative reduced-profile connection components according to a ferrule clip embodiment. As shown in FIGS. 4A-4D, a reduced-profile connection assembly may include a clip 405 (a "ferrule clip" or "reduced profile clip") arranged within an adapter 425 and configured to hold a ferrule 130 therein. The clip 405 may include hooks 410 configured to maintain the ferrule 130 within the adapter 425, for example, by engaging with the ferrule 130 and/or a pin holder 420 on a side opposite a connection side or surface of the ferrule. In some embodiments, the ferrule 130 may not include a pin holder 420. In such embodiments, a spacer (not shown) may be arranged within the clip 405 to engage the hooks 410 in a manner similar to the pin holder 420. In some embodiments, the hooks 410 may be configured to support and maintain a connection between the ferrule 130 and a corresponding ferrule (not shown) within the adapter similar to the functionality provided by the spring 225 and the spring push 220 in a conventional connection assembly.

In some embodiments, the clip 405 may be arranged within conventional components, such as a conventional adapter 425. For example, the reduced profile connection assembly may include an MT ferrule 130 and an MPO adapter 425. In some embodiments, the adapter 425 may include a reduced-profile component portion 435 and a conventional component portion 440. The reduced-profile component portion 435 may be configured to engage reduced-profile connection components, such as a ferrule 130 that is not arranged within or in association with conventional connection components, such as an ejector housing 205, a front housing 210, springs 230, spring 225, or the like. The conventional component portion 440 may be configured to engage conventional connection components, such as MT, MPO, and/or MTP. As such, reduced-profile connection components may be configured to operate with existing data transmission equipment, devices, connection assemblies, and/or the like.

Figure 4A:
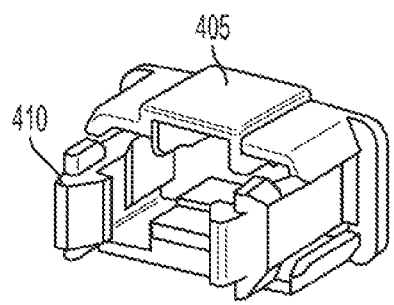
FIGS. 4A-4E depict illustrative reduced-profile connection components according to a ferrule clip embodiment.
Figure 4B:
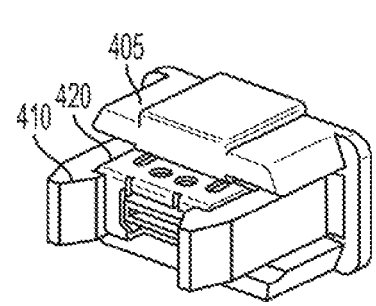
Figure 4C:
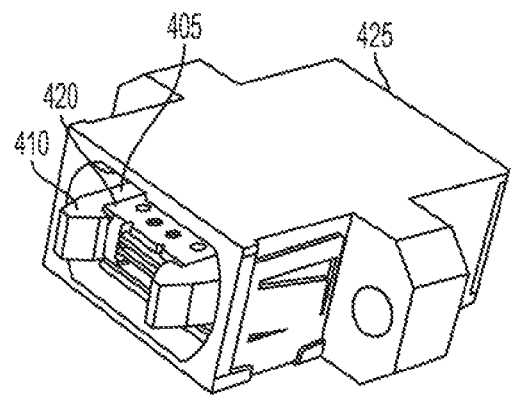
Figure 4D:
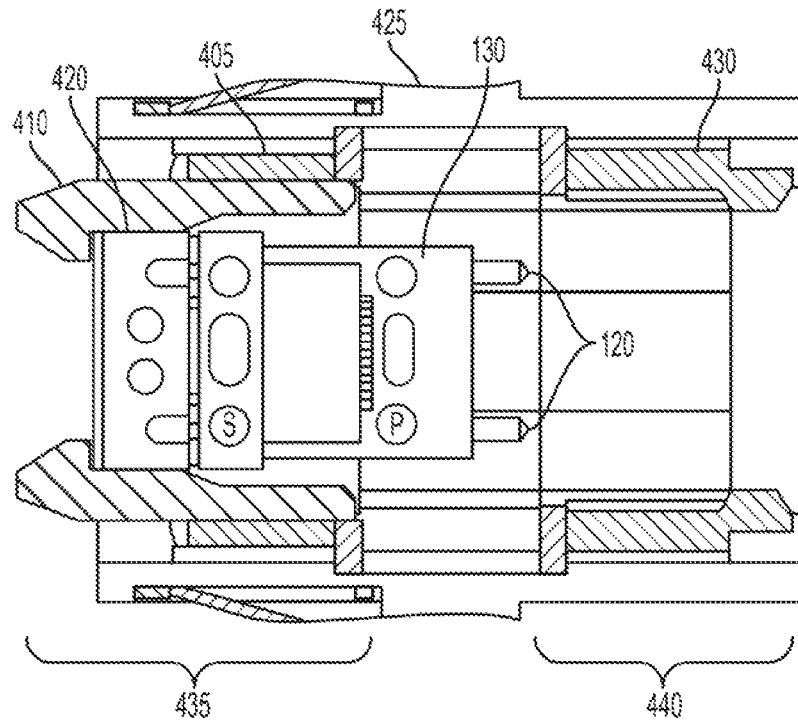

As shown in FIG. 4D, the adapter 425 may include a clip 430 for a second ferrule (not shown), such as a female ferrule corresponding with the male ferrule 130. Inserting the ferrule 130 within the clip 405 may connect the ferrule with the corresponding ferrule disposed within the clip 430. The hooks 410 may be configured to hold the ferrule 130 within the adapter 425 and to maintain the connection with the corresponding ferrule located in the clip 430.

In some embodiments, the adapter 425 may include an external portion 435 that may be located external to a communication device or structure (for instance, a wall) and an internal portion 440 that may be located internal to the communication device or structure. Non-limiting examples of communication devices include computing devices, servers, racks, switches, hubs, cabling, outlets, network testing equipment, or the like. In some embodiments, a first type of ferrule (for example, a female ferrule (not shown)) may be arranged within the internal portion 440 and a second type of ferrule (for example, a male ferrule 130) may be installed (or plugged) into the external portion 435 to form a connection with the first type of ferrule.

Figure 4E:
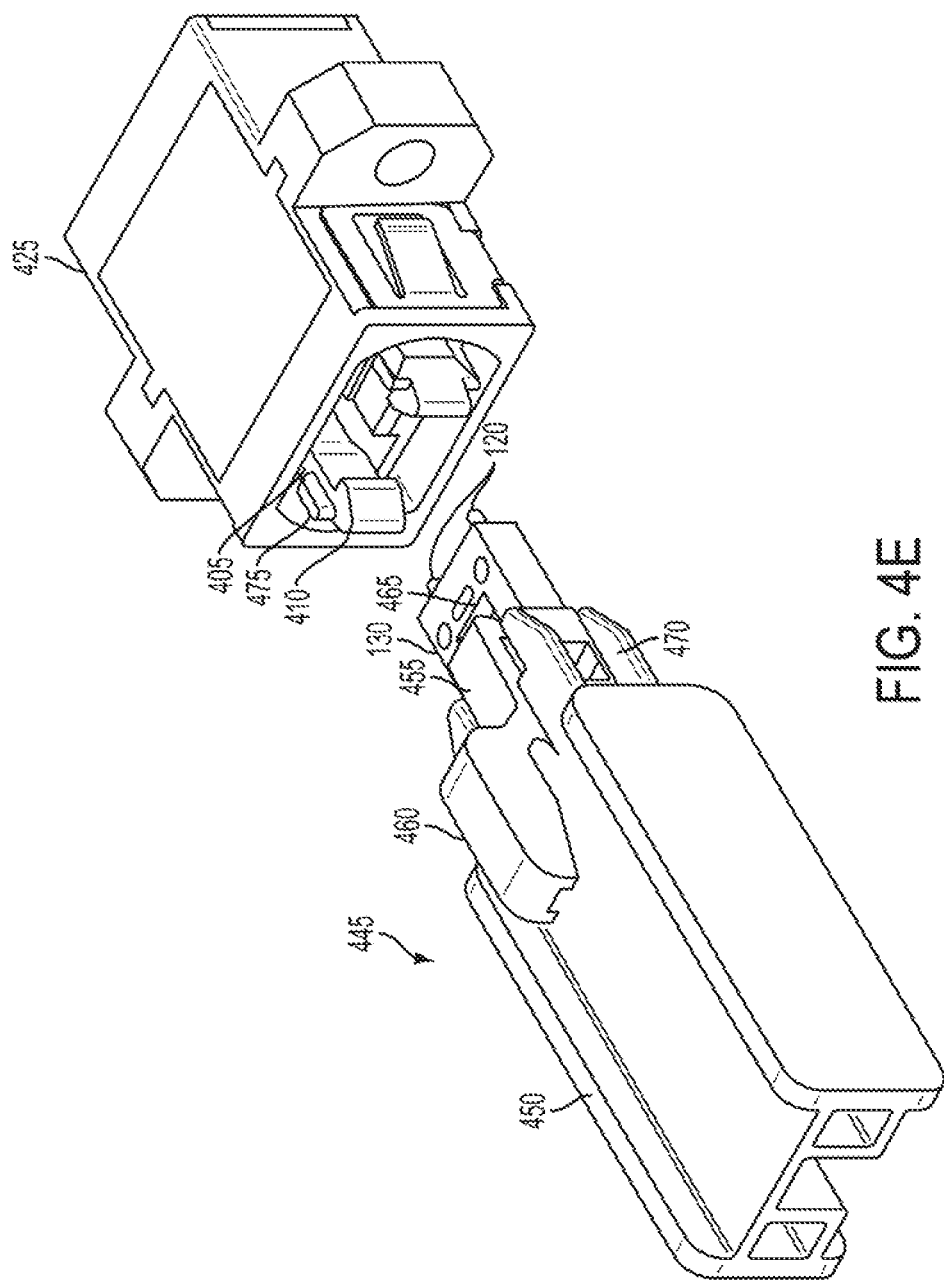

FIG. 4E depicts an illustrative ferrule installation device according to some embodiments. As shown in FIG. 4E, a ferrule installation device 445 may be used to install the ferrule 130 into the clip 410 of the adapter. The ferrule installation device 445 may include a lever 460 that may be pressed (for instance, pushed toward the body of the ferrule installation device) to raise a hook portion 455 thereof. The ferrule installation device 445 may grasp the ferrule 430 by raising the hook portion 455, inserting the ferrule into a frame portion 470 and releasing the lever 460 to position the hook portion 460 against or within a portion of the ferrule, such as within a recess 565 disposed within the ferrule. As the ferrule installation device 445 is inserted into the adapter, the frame portion 470 may engage the hooks 410 to spread them apart and allow the ferrule to be positioned within the clip 405. In some embodiments, the frame portion 470 may engage one or more protrusions 475 arranged on an outer surface of the hooks 410. Once the ferrule 430 has been positioned within the clip 405, the lever 460 may be pressed, thereby disengaging the hook portion 455 from the ferrule 130. As the ferrule installation device 445 is removed from the adapter 425, the hooks 410 close in and engage the ferrule 130. The ferrule installation device 445 may have various dimensions, including a length of about 20 millimeters to about 40 millimeters. In some embodiments, the ferrule installation device 445 may have a length of about 36.5 millimeters.

As compared with conventional connection components, such as connector 105, the ferrule clip embodiment depicted in FIGS. 4A-4C does not require a housing, such as ejector housing 205 and front housing 210. The ferrule clip embodiment may be configured to use a clip 405 adapted to hold and support a ferrule 130 without a housing and associated components, such as the spring 225 and the back pusher 220. In some embodiments, the hooks 410 of the clip 425 may only extend about 0 millimeters (for example, the clip is entirely or substantially entirely located within the adapter 425), about 1 millimeter, about 2 millimeters, about 3 millimeters, and any value or range between any two of these values (including endpoints) outside of the adapter 425. Accordingly, the ferrule clip embodiment may be used to establish a connection using about 30 millimeters to about 50 millimeters less space than conventional connection components.

Although the ferrule 130 depicted in illustrative embodiments herein, such as the ferrule clip embodiment depicted in FIGS. 4A-4C, is a male MT ferrule, embodiments are not so limited. Indeed, the ferrule 130 may be configured as any type and/or gender of ferrule capable of operating according to some embodiments. In particular, some embodiments are "gender neutral," in that either male or female connection components may be used therewith.

Figure 5A:
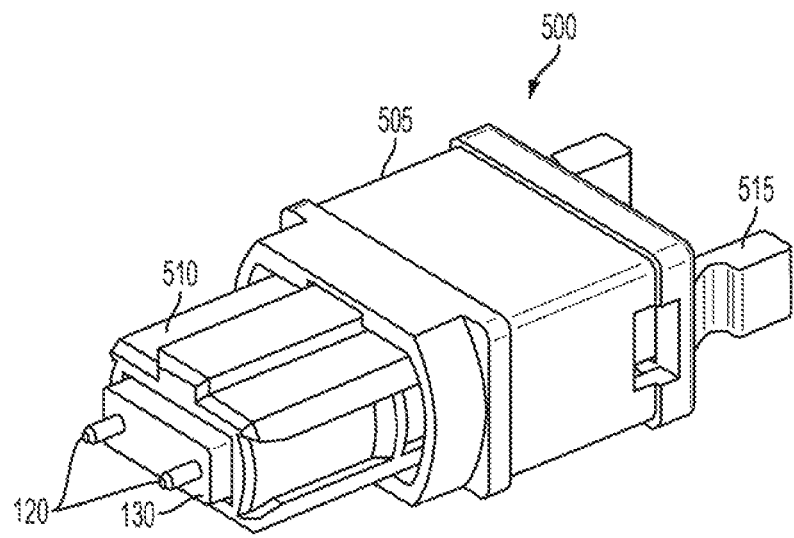
FIGS. 5A-5F depict reduced-profile connection components according to a dual-housing embodiment.
Figure 5B:
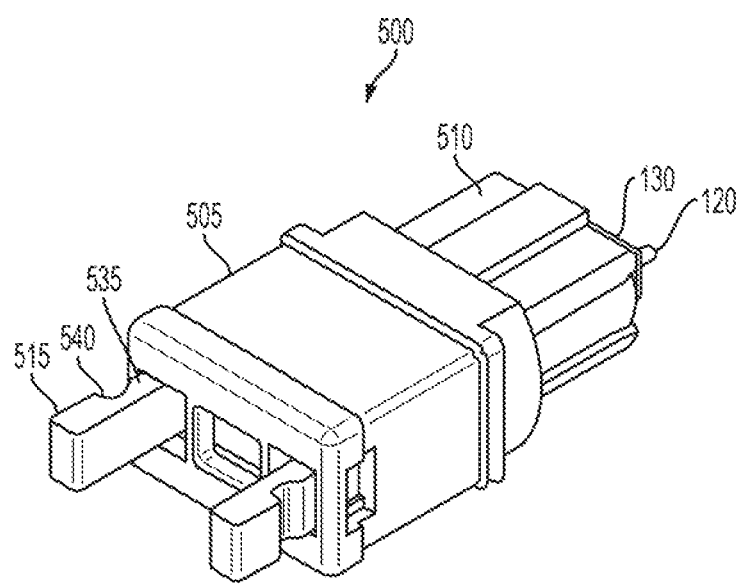
Figure 5C:
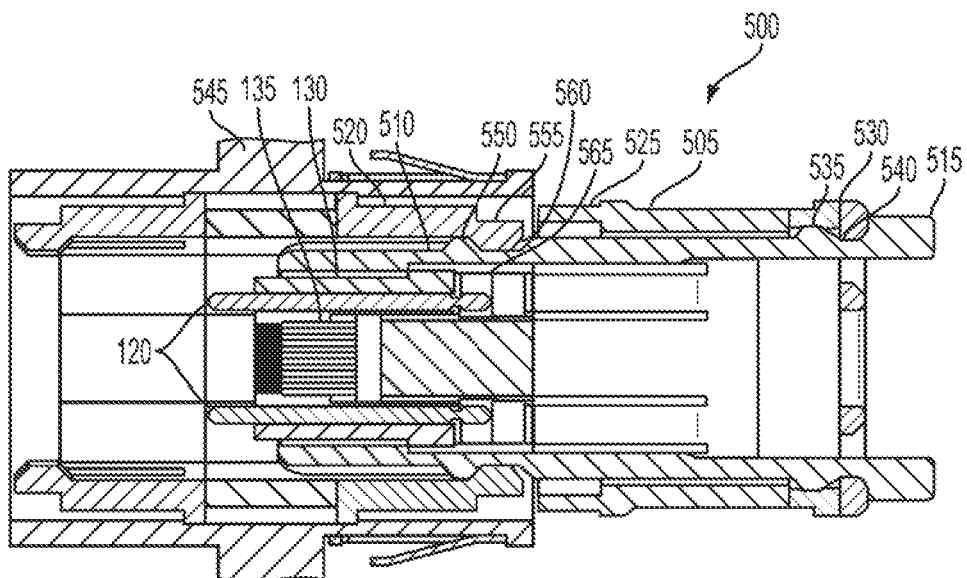
Figure 5D:
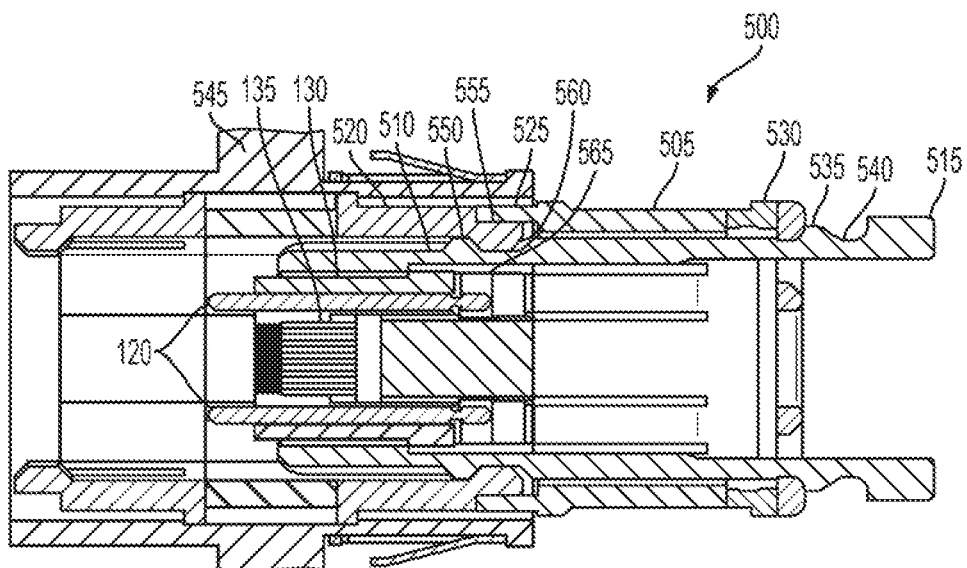

FIGS. 5A-5F depict reduced-profile connection components according to a dual-housing embodiment. As shown in FIGS. 5A and 5B, a reduced-profile connector 500 may include an inner housing 510 configured to hold a ferrule 130 in a front portion thereof. An outer housing 505 may be slidably disposed around the inner housing 505. The inner housing 510 may include flanges 515 having projections 535 and recesses 545 formed thereon. FIGS. 5C and 5D depict the connector 505 arranged within an adapter 545 in an unlocked position and a locked position, respectively. In some embodiments, the adapter 545 may include a conventional adapter and/or adapter components, such as clips ("adapter clips," "MPO adapter clips", or "conventional clips") 520. For example, the adapter 545 may include a conventional MPO adapter and conventional clips 520 configured to receive conventional ferrules, such as MT ferrules 130. In this manner, the reduced-profile connector 500 may be used with conventional connection adapters 545.

As the connector 500 is pushed into the adapter 545, projections 550 on the inner housing 510 may engage hooks 555 on the clip 520, thereby spreading the hooks apart 555 until the hooks clear the projections and seat within a recess 560. In the unlocked position, a distal portion 530 of the outer housing 505 may be seated in recesses 540 of the flanges 515. To lock the connector 505 in the adapter 545, the outer housing 505 may be pushed along the inner housing 510 in a direction toward the adapter. As the outer housing 505 moves toward the adapter 545, the distal portion 530 may push against the projections 535 of the flanges 515 and may push the flanges 515 inward (for instance, away from the outer housing). As the flanges 515 move inward, the distal portion 530 may slide over the projections 535 and the outer housing 505 may move toward the adapter 545. The flanges 515 may return to the straight position after the distal portion 530 clears the projections 535 and, therefore, the distal portion is no longer pushing on the projections. The projections 535 may prevent the outer housing 505 from sliding away from the adapter 545. When the distal portion 530 has cleared the projections 535, a proximal portion 525 of the outer housing 505 may engage the hooks 555, preventing the hooks from spreading apart and sliding over the projections 550.

Figure 5E:
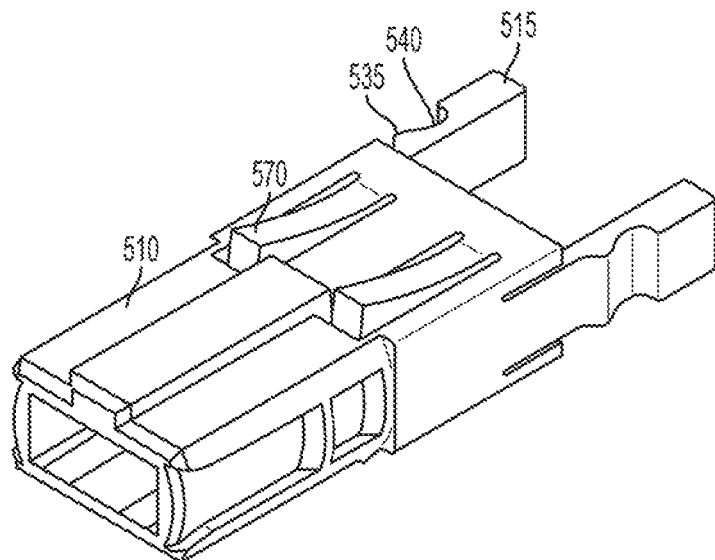
Figure 5F:
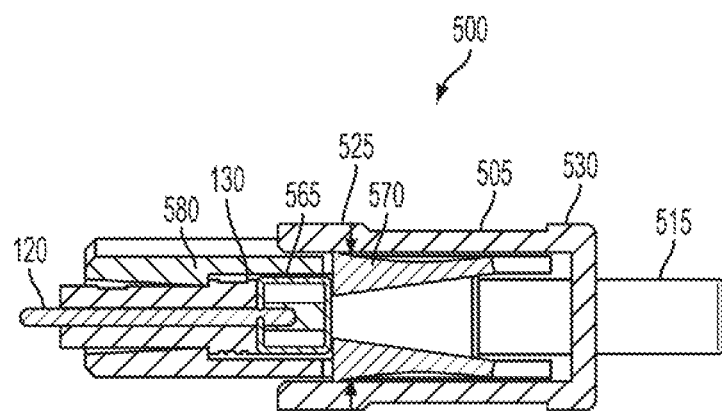

As shown in FIG. 5E, the inner housing 510 may include ferrule latches (or "bend-in latches") 570 arranged on one or more surfaces thereof. The ferrule latches 570 may be configured to be pushed inward toward the hollow center of the inner housing 510. In FIG. 5F, a cross-sectional view of the connector illustrates that the outer housing 505 may push the latches 570 inward to engage the ferrule 130 and/or a pin holder 565 connected to the ferrule. The internal surfaces of the inner housing 510 may also include projections 580 or other structures configured to engage the ferrule 530 to prevent the ferrule from moving in a direction opposite the ferrule latches 570. Accordingly, the ferrule latches 570 may be configured to push or otherwise engage the ferrule 130 and/or the pin holder 565 to push the ferrule in a first direction (for example, away from the flanges 515) and/or prevent movement of the ferrule in a second direction (for example, toward the flanges 515), while the projections 580 may be configured to prevent movement of the ferrule in the first direction. In this manner, the ferrule 130 may be supported and maintained within the inner housing 510 when the outer housing 505 is in a position that pushes down on the ferrule latches 570, for example, when the outer housing is in the locked position.

In some embodiments, the connector 500 may use only 2 parts, for instance, the outer housing 505 and the inner housing 510, to connect the ferrule 130 to a corresponding ferrule (not shown) within the adapter 545. In comparison, conventional connectors may require 7 components to achieve the same functionality. In some embodiments, the connector 505 may have a length of about 20 millimeters to about 30 millimeters. In some embodiments, the connector may have a length of about 26 millimeters. In some embodiments, the connector 505 may have a length of about 20 millimeters, about 22 millimeters, about 24 millimeters, about 26 millimeters, about 28 millimeters, about 30 millimeters, and any value or range between any two of these values (including endpoints). In some embodiments, the connector may have a length of about 26 millimeters. In some embodiments, when in the locked position, the connector 505 may extend out of the adapter 545 by about 15 millimeters, about 20 millimeters, about 25 millimeters, about 30 millimeters, and any value or range between any two of these values (including endpoints). In some embodiments, the connector 505 may extend out of the adapter 545 by about 24 millimeters.

Figure 6A:
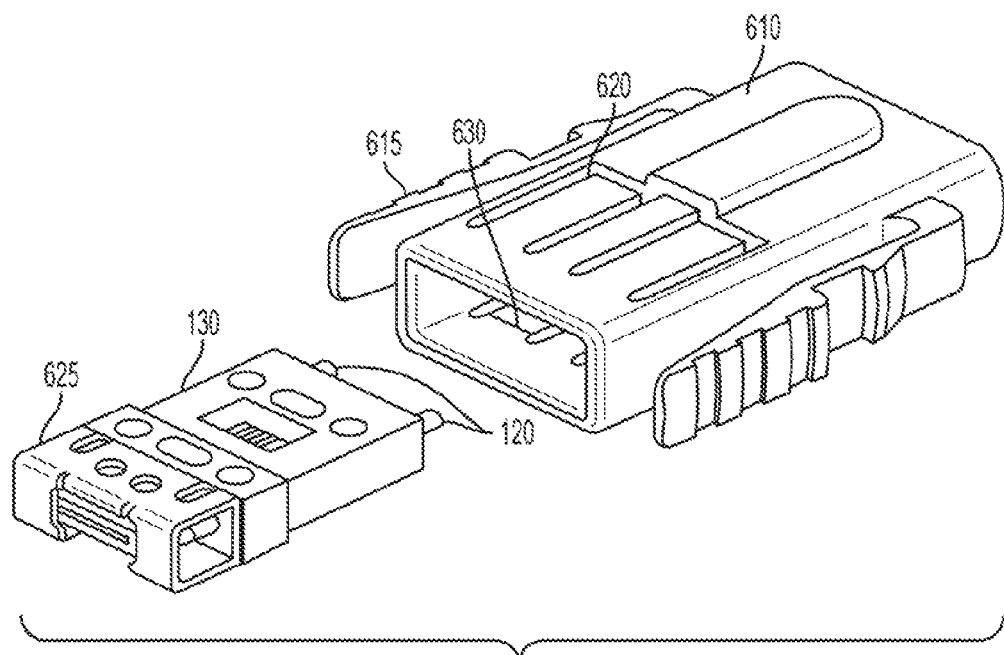
FIGS. 6A-6D depict illustrative reduced-profile connection components according to a first resilient latch embodiment.
Figure 6B:
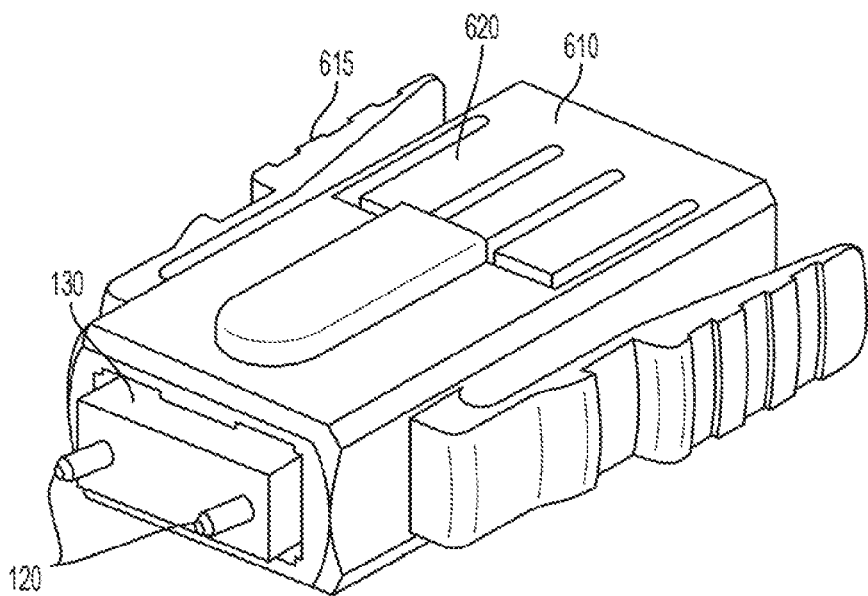

FIGS. 6A-6D depict illustrative reduced-profile connection components according to a first resilient latch embodiment. As shown in FIGS. 6A and 6B, a connector 610 may be configured to hold a ferrule 130. The connector 610 may include resilient latches, such as adapter latches 615 and ferrule latches 620. The ferrule latches 620 may be configured to maintain the ferrule 130 within the connector 610. For example, assembly of the connector 610 may include inserting the ferrule 130 into a rear opening 630 of the connector 610 and pushing the ferrule toward the front of the connector (for instance, the end opposite the rear opening).

As the ferrule 130 passes through the connector 610 the ferrule may engage the ferrule latches 620 and push the ferrule latches outward (for instance, away from the ferrule). When the ferrule 130 and/or pin holder 625 passes the ferrule latches 620, the latches may no longer being pushed outward. As such, the ferrule latches 620 may retract to their normal position. The ferrule latches 620 may include projections or other structures (not shown) extending inward. These projections may engage the ferrule 130 and/or pin holder 625 to prevent the movement of the ferrule toward the rear opening 630. The connector 610 may also include one or more internal projections or other internal structures configured to project inward toward the hollow cavity of the connector to engage a front portion of the ferrule 130 and/or pin holder 625. These internal projections may prevent movement of the ferrule 130 in a direction toward the front of the connector 610, away from the rear opening 630. In this manner, the ferrule 130 may be held within the connector 610.

Figure 6C:
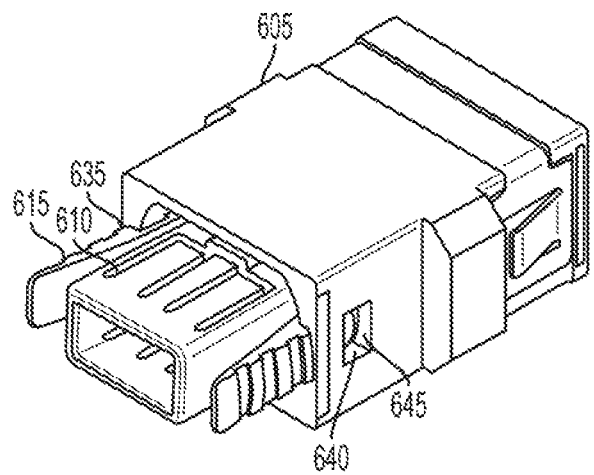
Figure 6D:
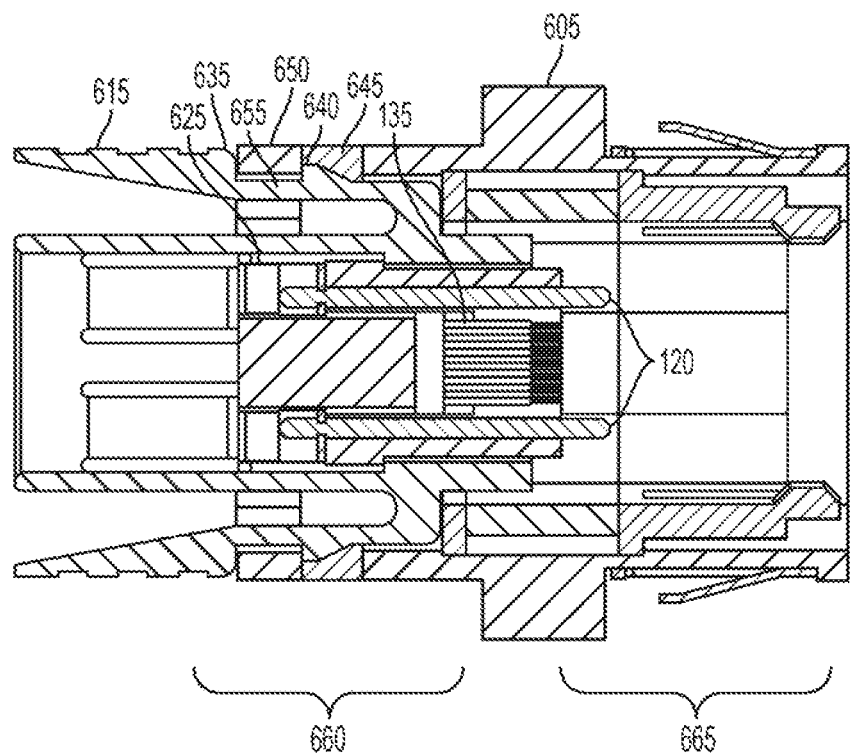

FIGS. 6C and 6D depict a connector 610 arranged within an adapter 605. To insert the connector 610 into the adapter 605, the adapter latches 615 may be pressed inward, toward the body of the connector sufficient to allow the first projections 640 to clear inner wall portions 650 of the adapter. When the first projections 640 have cleared the inner wall portions 650, the first projections may seat in recesses (or openings) 645 in the inner wall of the adapter 605 and the inner wall portions 650 may seat in recesses 655 of the adapter latches 615. When the connector 610 is in the adapter, for example, when the first projections have seated in the recesses 645 and/or the ferrule 130 has established a connection with a corresponding ferrule (not shown), the inner pressing force on the adapter latches 615 may be released and second projections 635 may interface with the inner wall portions 650. The second projections 635 may prevent movement of the connector 610 further into the adapter 605 by engaging the inner wall portions. Accordingly, removal and/or insertion (plugging in) of the connector 610 into the adapter 605 may only require pressing on the adapter latches 615 while pushing the connector into the adapter.

In some embodiments, the adapter 605 may include a reduced-profile component portion 660 and a conventional component portion 665. The reduced-profile component portion 660 may be configured to engage reduced-profile connection components, such as the connector 610 and/or a ferrule 130 that is not arranged within or in association with conventional connection components, such as an ejector housing 205, a front housing 210, springs 230, spring 225, or the like. The conventional component portion 665, may be configured to engage conventional connection components, such as MT, MPO, and/or MTP. As such, reduced-profile connection components may be configured to operate with existing data transmission equipment, devices, connection assemblies, and/or the like.

In some embodiments, the connector 610 may use only 1 part (the actual connector 610), not including the ferrule 130. In comparison, conventional connectors may require 7 components to achieve the same functionality. In some embodiments, the connector 610 may have a length of about 10 millimeters to about 20 millimeters. In some embodiments, the connector may have a length of about 13 millimeters. In some embodiments, the connector 610 may have a length of about 10 millimeters, about 12 millimeters, about 14 millimeters, about 16 millimeters, about 18 millimeters, about 20 millimeters, and any value or range between any two of these values (including endpoints).

Figure 7A:
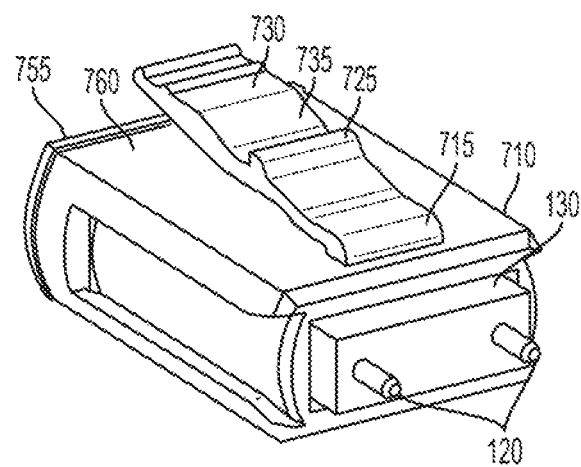
FIGS. 7A-7J depict illustrative reduced-profile connection components according to a second resilient latch embodiment.
Figure 7B:
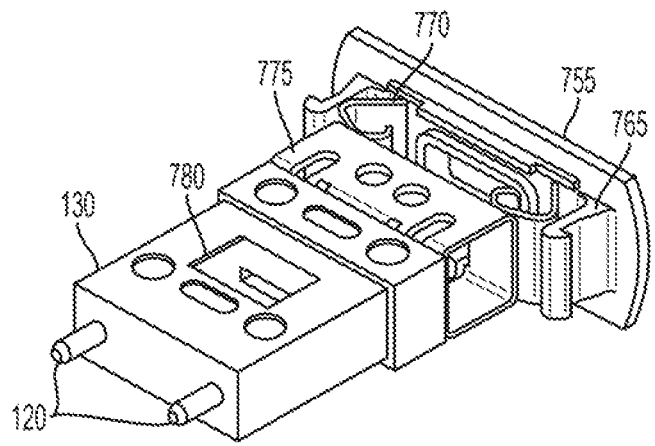
Figure 7C:
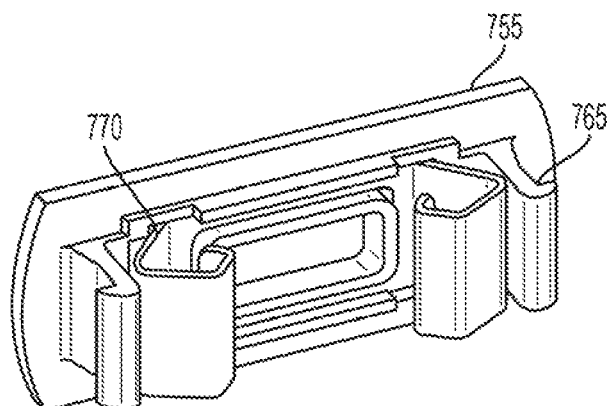

FIGS. 7A-7J depict illustrative reduced-profile connection components according to a second resilient latch embodiment. As shown in FIGS. 7A and 7B, a connector 710 may be configured to hold a ferrule 130, for example, connected to a pin holder 775. The ferrule 130 may include a recess 780 or other similar structure for engaging portions of the inside surface of the main body 760. The connector 710 may include a resilient adapter latch 715 arranged on a top portion thereof. The adapter latch 715 may include a catch projection 725, a catch surface 730, and a recess 735. The connector 710 may include a main body 760 and a rear cover assembly (or "rear cover") 755 configured to attach to (or "snap") into the main body. The rear cover 755 may include springs 770 and flanges 765. In some embodiments, the springs 770 may be configured to press against the flanges 765 to provide a force pushing the flanges outward (for example, away from the springs). In some embodiments, the flanges 765 may provide a barrier to the springs 770 such that the force of the springs may be directed toward the ferrule 130 and/or pin holder 775 instead of, without the flanges, in a direction orthogonal to the ferrule. In some embodiments, the springs 770 may be formed as one piece with curled ends configured to provide a resilient force.

Figure 7D:
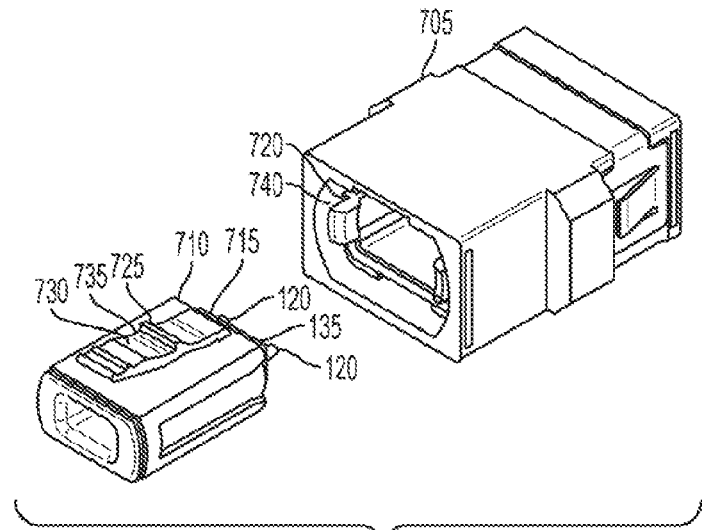
Figure 7E:
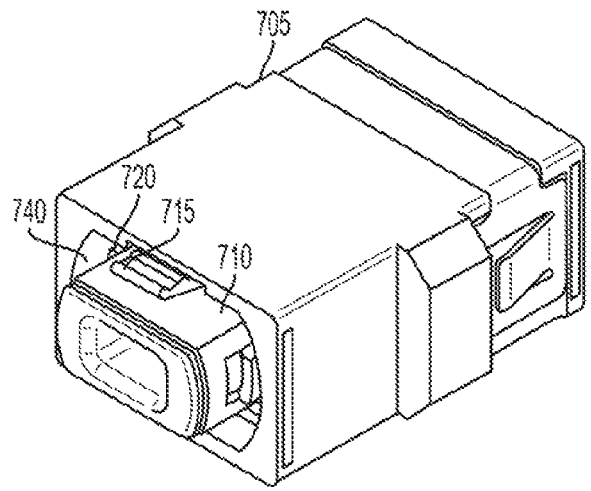
Figure 7F:
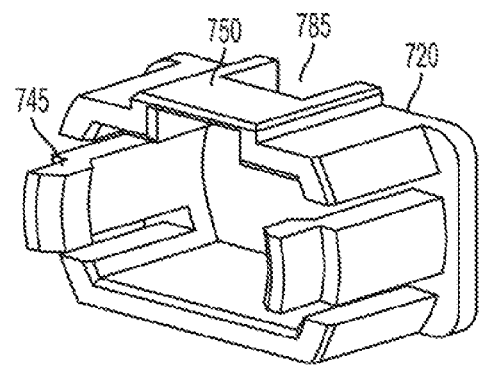

FIGS. 7D and 7E depict the connector 710 and an adapter 705 configured to receive the connector 710. The adapter 705 may include a clip 720 having, as depicted in FIG. 7F, hooks 745, a latch catch 750 formed, and an opening immediately adjacent the latch catch. The connector 710 may be inserted into the adapter 705 by pressing down (for instance, toward the main body 760) the adapter latch 715 while pushing the connector into the opening 740 of the adapter. As shown in more detail in FIGS. 7G and 7H, the connector 710 may engage the clip 720 within the adapter to maintain (or "lock") the connector within the adapter.

Figure 7G:
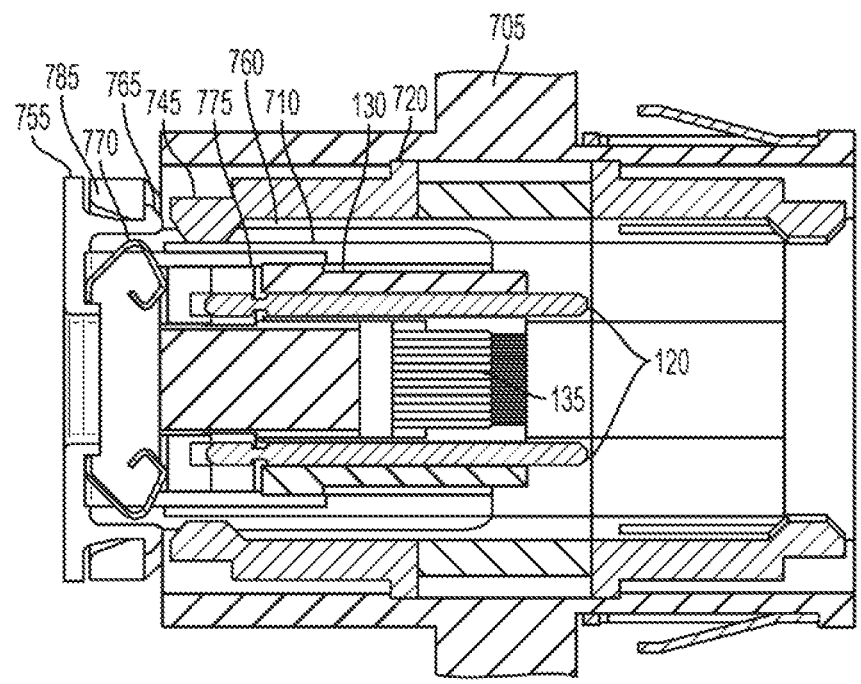
Figure 7H:
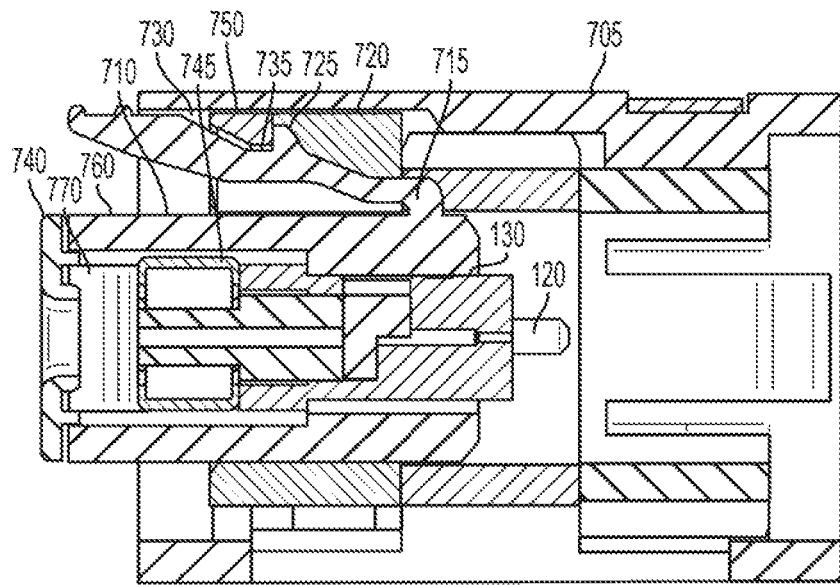

FIGS. 7G and 7H depict a cross-section of top-down view and a side view, respectively, of a connector 710 installed in an adapter 705. As shown in FIG. 7G, the rear cover 755 may be installed within the main body 760 of the connector 205. As the rear cover 755 is being pushed into the main body 760, the flanges 765 may be pressed inward (toward the springs 770) until the flanges clear a back portion 785 of the main body and become seated on an internal side of the back portion. The springs 770 may engage the ferrule 130 and/or pin holder 775 and push the ferrule in a direction away from the rear cover 755.

In some embodiments, the adapter 705 may be used for conventional connection components (not shown), such as MPO connectors, and for reduced-profile connectors 710. In some embodiments, the hooks 745 of the clip 720 may not engage or may not substantially engage the connector. For instance, the hooks 745 may not touch and/or engage the connector 710 in a manner that retains the connector within the adapter 705. In some embodiments, the hooks 745 may be used to engage and retain a conventional connector, such as an MPO connector.

The connector 710 may be inserted in the adapter 705 by pushing down on the adapter latch 715 to allow the catch projection 725 of the adapter latch to clear (to slide under) the latch catch 750 of the clip 720 while pushing the connector through the opening 740. When the catch projection 725 has cleared the latch catch 750, the adapter latch 715 may be released. The resilient nature of the adapter latch 715 may cause the adapter latch to push upward (away from the main body 760). The upper force of the adapter latch 715 may cause the catch projection 725 to engage an inner surface of the latch catch 750, the latch catch to be seated in the recess 735, and/or the catch surface 730 to engage an outer surface of the latch catch. The engagement between the catch projection 725 and the latch catch 750 may prevent the connector 710 from being removed from the adapter 705. Accordingly, removal and/or insertion (plugging in) of the connector 710 into the adapter 705 only requires pressing on the adapter latches 715 while pushing the connector into the adapter.

Figure 7I:
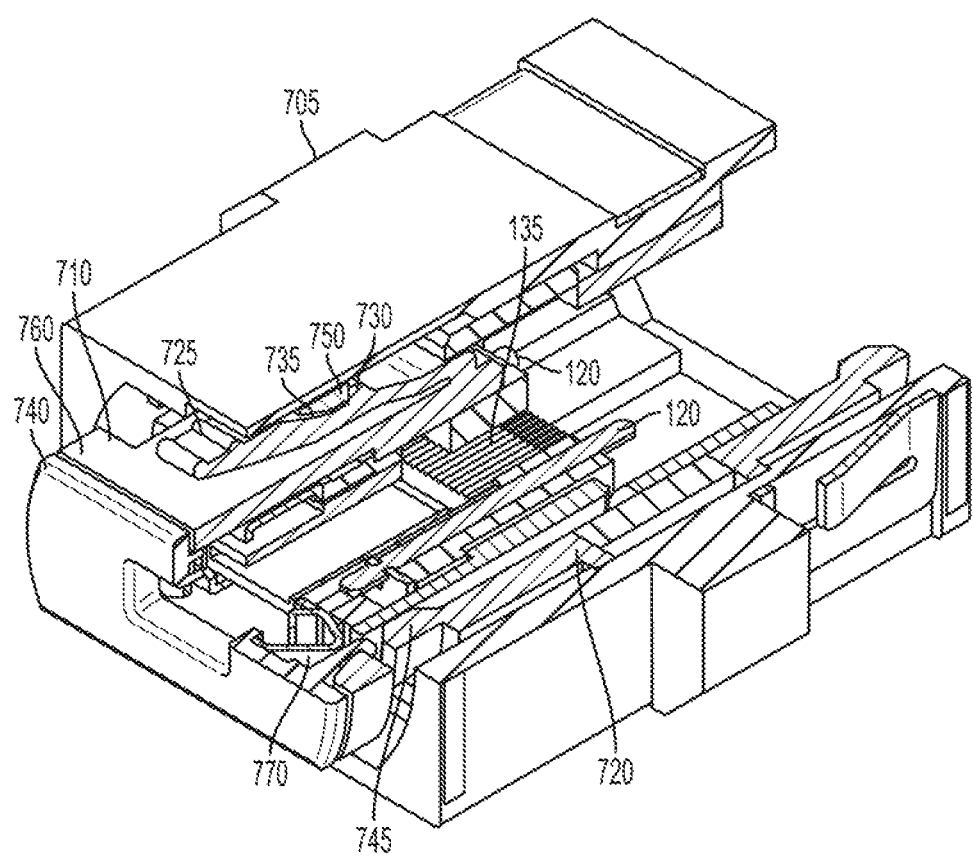
Figure 7J:
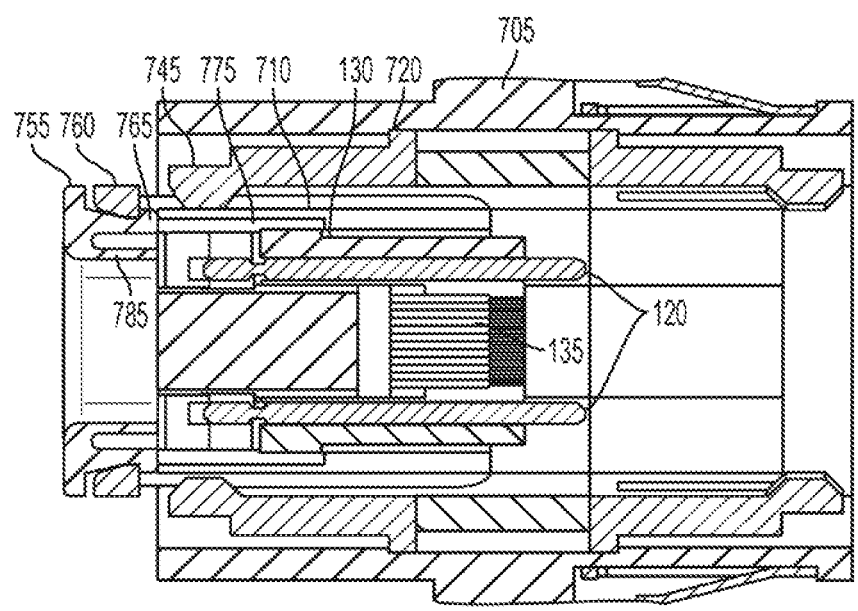

FIG. 7I depicts an internal view of the connector 710 installed within the adapter 705. FIG. 7J depicts a connector 710 in which the pin holder engages a spring element 785 instead of the spring 770.

In some embodiments, the connector 710 may use only 3 or less parts, not including the ferrule 130. For example, the connector 710 may include the main body 760, the rear cover 755, and/or the spring 770. In comparison, conventional connectors may require 7 components to achieve the same functionality. In some embodiments, the connector 710 may have a length of about 10 millimeters to about 20 millimeters. In some embodiments, the connector may have a length of about 13 millimeters. In some embodiments, the connector 710 have a length of about 10 millimeters, about 12 millimeters, about 14 millimeters, about 16 millimeters, about 18 millimeters, about 20 millimeters, and any value or range between any two of these values (including endpoints).

Figure 8A:
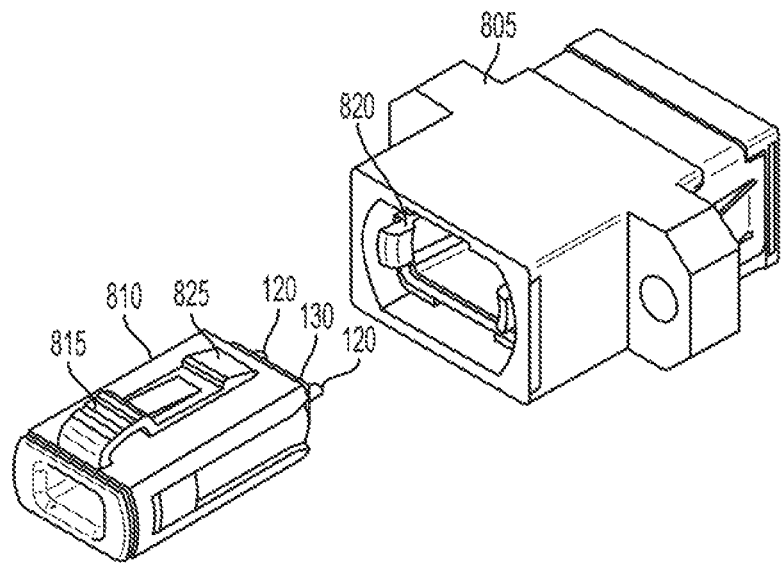
FIGS. 8A-8E depict illustrative reduced-profile connection components according to a third resilient latch embodiment.
Figure 8B:
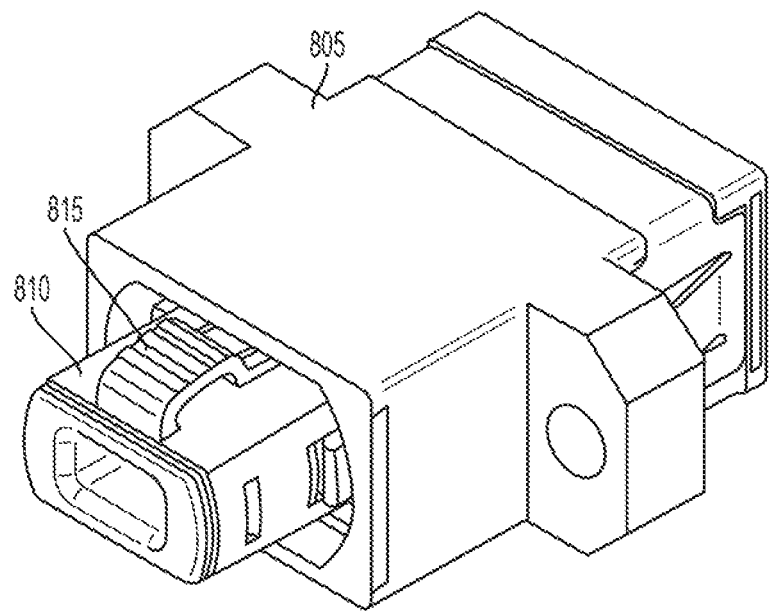
Figure 8C:
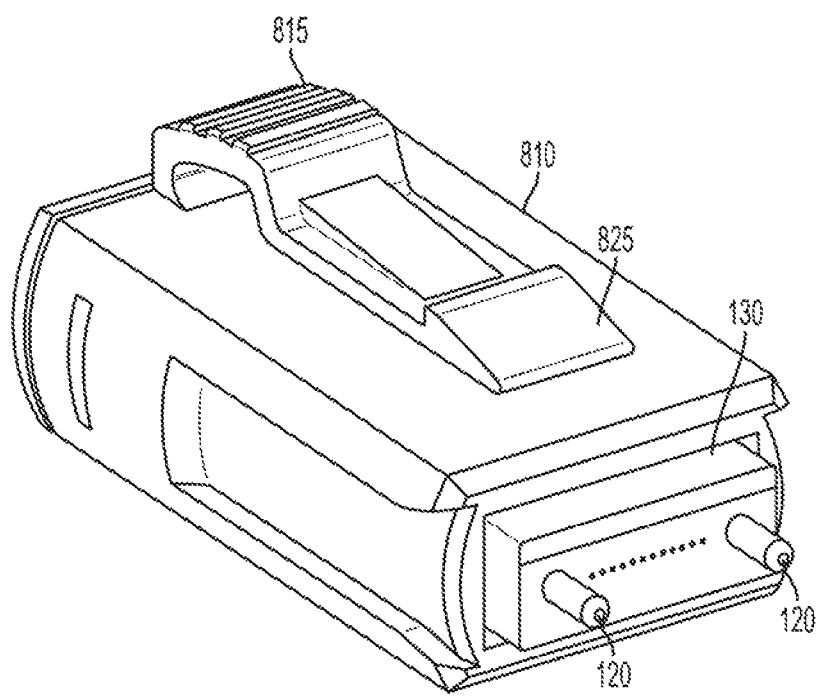

FIGS. 8A-8E depict illustrative reduced-profile connection components according to a third resilient latch embodiment. As shown in FIGS. 8A-8C, a connector 810 may be configured to hold a ferrule 130. The connector 810 may include a resilient adapter latch 815 on a top portion thereof. The adapter latch 815 may include a catch projection 825.

Figure 8D:
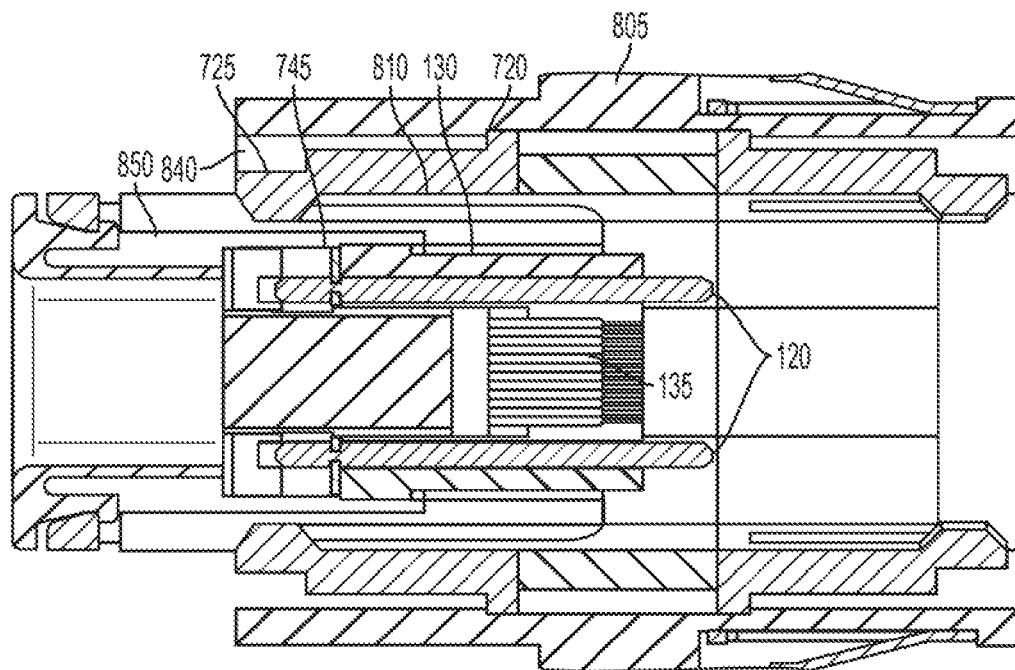
Figure 8E:
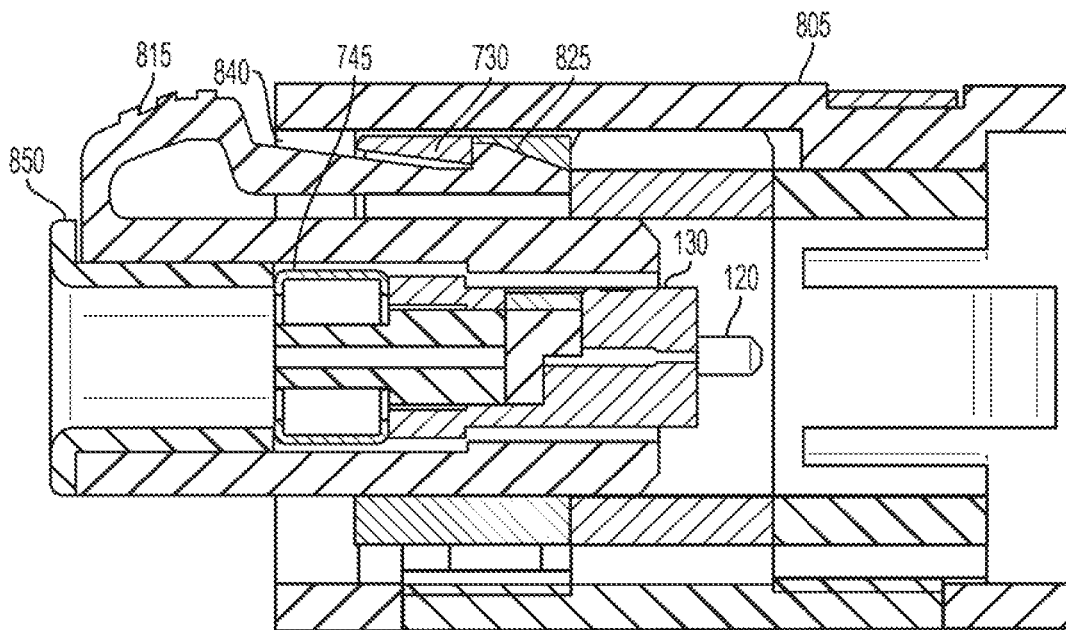

FIGS. 8D and 8F depict a cross-section of top-down view and a side view, respectively, of a connector 810 installed in an adapter 805. The adapter 805 may include a clip 720, as depicted in FIG. 7F, having hooks 745 and a latch catch 750 formed thereon. In some embodiments, the adapter 705 may be used for conventional connection components (not shown), such as MPO connectors, and for reduced-profile connectors 710. In some embodiments, the hooks 745 of the clip 720 may not engage or may not substantially engage the connector. For instance, the hooks 745 may not touch and/or engage the connector 710 in a manner that retains the connector within the adapter 705. In some embodiments, the hooks 745 may be used to engage and retain a conventional connector, such as an MPO connector. The connector 810 may include various structures 850, such as projections, ridges, spacers, or the like that are configured to engage the pin holder 745 and/or the rear portion of the ferrule 130 to prevent the ferrule from moving toward the rear portion of the connector 810.

The connector 810 may be inserted into the adapter 805 by pressing down (for instance, toward the ferrule 130) the adapter latch 815 while pushing the connector into the opening 840 of the adapter. The connector 810 may engage with the clip 720 within the adapter to maintain (or "lock") the connector within the adapter. The connector 810 may be inserted in the adapter 805 by pushing down on the adapter latch 815 to allow the catch projection 825 of the adapter latch to clear (to slide under) the latch catch 750 of the clip 720 while pushing the connector through the opening 840. When the catch projection 825 has cleared the latch catch 750, the adapter latch 815 may be released. The resilient nature of the adapter latch 815 may cause the adapter latch to push upward (for instance, away from the ferrule 130). The upper force of the adapter latch 815 may cause the catch projection 825 to engage an inner surface of the latch catch 750. The engagement between the catch projection 825 and the latch catch 750 may prevent the connector 810 from being removed from the adapter 805. Accordingly, removal and/or insertion (plugging in) of the connector 810 into the adapter 805 only requires pressing on the adapter latches 815.

In some embodiments, the connector 810 may use only 2 or less parts, not including the ferrule 130. For example, the connector 810 may include a main body and a rear cover. In comparison, conventional connectors may require 7 components to achieve the same functionality. In some embodiments, the connector 810 may have a length of about 10 millimeters to about 20 millimeters. In some embodiments, the connector may have a length of about 13 millimeters. In some embodiments, the connector 810 have a length of about 10 millimeters, about 12 millimeters, about 14 millimeters, about 16 millimeters, about 18 millimeters, about 20 millimeters, and any value or range between any two of these values (including endpoints).

Although a fiber optic connector has been used as an illustrative embodiment, this detailed description is not so limited, as any type of electrical and/or communication connector may be used according to some embodiments. The connectors, adapters, and connection assemblies formed therefrom may be used in combination with other connection elements and/or materials, such as crimpers, bands, straps, ferrules, locking materials, fluids, gels, or the like.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to"). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example), the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, or the like. As a non-limiting example, each range discussed herein can be readily broken down into a lower third, a middle third, and an upper third. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A reduced-profile connection assembly, comprising:
    a ferrule having a connection end;
    a connector comprising:
        an inner housing having the ferrule fixedly arranged therein at a first end and flanges extending from a second end opposite the first end, and
        an ejector housing disposed around the inner housing and configured to slide along the inner housing between a locked position and an unlocked position; and
    an adapter having a clip fixedly arranged therein, the clip having hooks configured to engage protrusions extending from an outer surface of the inner housing to prevent movement of the inner housing within the adapter, wherein the ejector housing interfaces with the clip in the locked position to prevent disengagement of the hooks from the protrusions.

2. The reduced-profile connection assembly of claim 1, wherein the ferrule is a fiber optic ferrule.

3. The reduced-profile connection assembly of claim 1, wherein the ferrule is a mechanical transfer ferrule.

4. The reduced-profile connection assembly of claim 1, wherein at least a portion of the adapter is configured as a multi-fiber push-on/pull-off adapter.

5. The reduced-profile connection assembly of claim 1, wherein the inner housing comprises at least one ferrule latch configured to engage the ferrule at an end opposite the connection end, thereby preventing movement of the ferrule within the inner housing in a direction toward the flanges.

6. The reduced-profile connection assembly of claim 5, wherein the ejector housing is configured to push the at least one ferrule latch into engagement with the ferrule.

7. The reduced-profile connection assembly of claim 1, wherein each of the flanges comprise a recess and a projection,
    wherein a distal portion of the ejector housing is configured to be seated in the recess when in the locked position.

8. The reduced-profile connection assembly of claim 7, wherein a distal portion of the ejector housing is configured to be seated in the recess when in the unlocked position, thereby preventing movement of the ejector housing in a proximal direction along the inner housing.

9. The reduced-profile connection assembly of claim 7, wherein a proximal portion of the ejector housing is configured to engage the projection when in the locked position, thereby preventing movement of the ejector housing in a distal direction along the inner housing.

10. The reduced-profile connection assembly of claim 1, wherein the connector comprises 2 parts.

11. The reduced-profile connection assembly of claim 1, wherein the connector has a length of about 20 millimeters to about 30 millimeters.

12. The reduced-profile connection assembly of claim 1, wherein the connector has a length of about 26 millimeters.

13. The reduced-profile connection assembly of claim 1, wherein the connector extends outside of the adapter when in the locked position about 15 millimeters to about 30 millimeters.

14. The reduced-profile connection assembly of claim 1, wherein the connector extends outside of the adapter when in the locked position about 24 millimeters.

* * * * *